Aug. 2, 1938.                W. F. ARNOLD                2,125,413
              METHOD OF IMPREGNATING ELECTRIC CONDENSERS
                        Filed Nov. 6, 1935
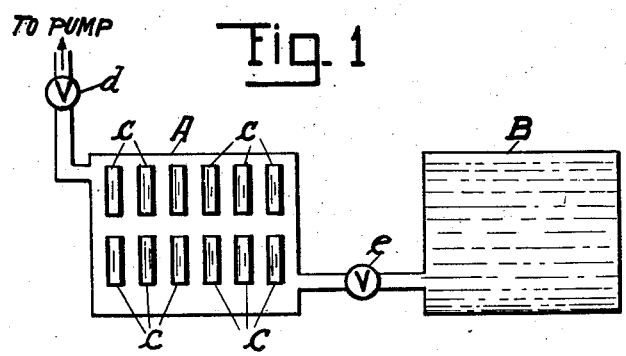
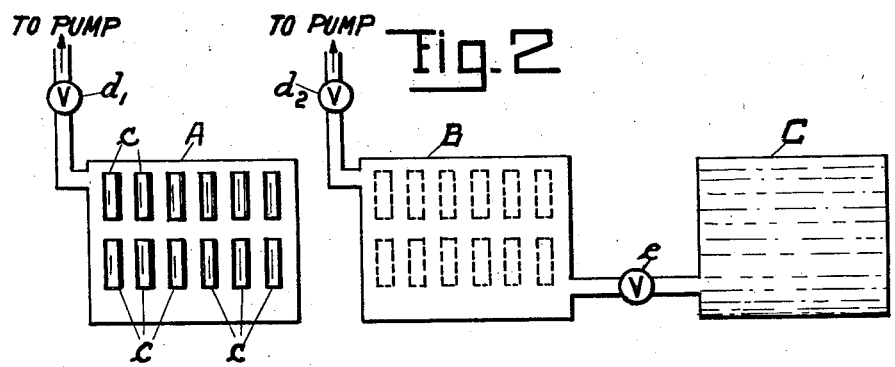
INVENTOR.
WILLIAM FRENCH ARNOLD
BY
ATTORNEY.

Patented Aug. 2, 1938

2,125,413

UNITED STATES PATENT OFFICE 2,125,413

METHOD OF IMPREGNATING ELECTRIC CONDENSERS

William French Arnold, Mount Vernon, N. Y., assignor to Cornell-Dubilier Corporation, New York, N. Y., a corporation of New York Application November 6, 1935, Serial No. 48,493

8 Claims. (Cl. 91—70)

The present invention relates to a method of impregnation of fibrous or porous substances such as paper or the like with oil or similar insulating material for use as insulation in electrical apparatus such as a dielectric in an electrical condenser.

More particularly the invention is concerned with the impregnation of paper or similar fibrous substances with oil known as castor oil or similar vegetable oils such as rapeseed oil, sperm oil, and related materials. It has been found that certain oils of the above type, such as primarily castor oil have a very high dielectric constant as compared to the ordinary insulating oils available for use in electrical condensers and similar devices. A good insulating oil available at present has a dielectric constant of about 2.8. Other insulating materials in the form of suitable chemical compounds have become known as having higher dielectric constants, such as chlorinated diphenyl also known as pyranol with a dielectric constant of about 3.6. Castor oil as known in the chemical industry has a dielectric constant of 4.3 so that when used in electrical condensers a thinner paper or other separator between the electrode foils can be used, resulting in a substantial decrease of size and bulk of a condenser of given electrical capacity or an increase in capacity for a condenser of the same size compared with an ordinary oil condenser.

While it has been known in the art that castor oil and in general related materials herein referred to as vegetable oils can be used as insulating impregnating compounds in electrical apparatus such as electric condensers, the use of these materials has not been practicable because in impregnating the condensers under a vacuum it is necessary to heat the condenser units to a sufficient temperature in order to expel all the air and moisture within the paper or other fibrous material serving as the separator between the condenser electrodes. When vegetable oils, such as castor oil, however are heated to temperature required for securing efficient removal of all the moisture and air from the condenser body, its electrical characteristics are changed by the action of the heat through oxidation, acidification or other chemical and physical reactions with the result of increased electrical losses of the condenser. For these and other reasons, it has not been practicable and economical to use vegetable oils such as castor oil as an impregnating means for electrical condensers and similar devices.

Accordingly, one object of this invention is to substantially overcome the above disadvantages and to provide a novel method for impregnating electrical condensers or similar devices with vegetable oils, more particularly with castor oil or in general to provide a method of impregnating condensers and similar devices with impregnating insulating medium which is likely to undergo a change of its insulating and other electrical characteristics when heated beyond a predetermined temperature during the impregnating process.

Another object and feature of the invention is the provision of a method of impregnating electrical condensers and similar devices including fibrous or porous substances with a liquid impregnating medium whereby the insulating medium remains in its original state and is not oxidized or acidified or otherwise chemically or physically affected by the action of heat and the presence of moisture to an extent as to alter its insulating and other electrical characteristics.

The invention has other objects and aspects which will appear hereinafter in the detailed description thereof in connection with the accompanying diagrammatic drawing in which Fig. 1 illustrates the separate steps of one form of practicing the invention, and Fig. 2 illustrates a modification of a method of impregnation according to the invention.

According to one method for carrying out the invention, two treating tanks are provided as shown at A and B in Fig. 1 of the drawing. The condenser units shown at c to be impregnated may be either round, flat, square, or of any other desired shape, and may consist of wound units or of units assembled in any other well known manner comprising interleaved metal foil and fibrous separator such as paper. The condenser units are first placed in the vacuum treating tank A which is heated to the desired temperature and the air exhausted from the tank so as to expel air and moisture from the condenser units in a known manner. Care should be taken that the heat applied does not injure the dielectric of the condenser units. The castor oil or similar material is kept at substantially room temperature or thereabouts, in a second container B connected to the tank A through a connecting pipeline including a valve e. After the desired vacuum in the drying tank A has been obtained and all the humidity exhausted from the condenser units, which may be ascertained by means of indicating instruments, the heat supply such as a steam or gas heating system or the like is then interrupted and the valve and connection to the vacuum pump shown at d shut off from the tank A and the tank B containing the cool or unheated castor oil or similar impregnating material connected to the tank A by opening the valve e. Due to the vacuum effect the castor oil or equivalent material is drawn into the treating tank and thoroughly permeates into the condensers or condenser units c thus causing an efficient and thorough impregnation of the paper sheets or other fibrous separating material interleaved with the metallic condenser electrodes. Since the tank B and the vegetable oil contained therein are at room temperature, the oil, on striking the warm condensers in the tank A, will thin out sufficiently to permeate into and thoroughly impregnate the units which will cool immediately.

It was found from experiments in practice that the heat contained in the condenser units after interrupting the heat supply is sufficient to momentarily thin out the castor oil or similar impregnating material so as to allow it to thoroughly permeate into and impregnate the condenser dielectric without materially affecting the electrical characteristics of the impregnating material. In other words, the impregnating material is not heated or pre-heated continuously over a long period as is customary in hitherto known methods of impregnating electrical condensers but the heating takes place only during a short period, that is, during the impregnating period proper indirectly by contact of the substantially un-heated or cool impregnating oil with the sufficiently pre-heated condenser units as described herein. In this manner a prolonged heating and consequent impairment of the electrical characteristics of the castor oil or equivalent impregnating material is substantially avoided. This impairment when excessively heating the castor oil or similar material is obviously due to an oxidizing or acidifying effect or to a similar chemical and/or physical reaction taking place by the action of the heat and in the presence of moisture in the fibrous dielectric material of the condenser.

In general, the novel method according to the invention involves the steps of heating only the condensers or other devices to be impregnated to the requisite temperature for practically removing all traces of air and moisture therein while the impregnating medium proper, such as the castor oil or compound of similar characteristic is kept at substantially room temperature or thereabouts and heated only momentarily through contact with the warm condensers or other devices in such a manner that the temperature of the impregnating medium remains within a safe limit from the temperature beyond which its insulating and other electrical characteristics would suffer serious impairment, while insuring the requisite fluidity for thorough and efficient impregnation.

In accordance with another method of practicing the invention, the impregnation may be carried out in three successive steps by the employment of a pre-drying step in addition to the steps above described. For this purpose three treating tanks A, B and C are provided as shown in Fig. 2. The condenser units or similar devices c are first placed in the first or pre-drying vacuum tank shown at A and heated and pumped dry in a well known manner so that all moisture and air is removed from the condensers and then the units are heated to the desired temperature. The hot units are then taken out in trays or containers and placed in the second or impregnating tank shown at B which is in turn heated and pumped at a lower temperature than the temperature used in the first drying process and which is insufficient to cause serious oxidation or other impairment of the castor oil or medium of similar characteristics during the subsequent impregnating process. Tanks A and B are connected to a vacuum pump in any known manner and provided with shut-off valves $d^1$ and $d^2$ respectively as shown. The second tank is connected with a third tank C in the same manner as shown in the drawing which contains the impregnating oil and is sealed from the outside air and moisture. After the units are slightly heated and dried in the second treating tank and all the air removed from this tank, the castor oil is allowed to flow in from the third tank by opening the valve e and impregnate the units in a manner described hereinbefore. It is important however that the heat is shut off in the second tank when the castor oil is allowed to enter and sufficient heat is retained in the condenser units to render the castor oil sufficiently fluid for impregnation but without impairing its insulating electrical characteristics in a manner similar as described in connection with Fig. 1. It will be noted that in such a process no air is allowed to come in contact with the castor oil at any time, thus preventing any serious oxidation. The time of drying, the temperature and the degree of vacuum are to be determined by the type of condenser and the degree of moisture to be removed, as will be understood.

In accordance with a practical method of impregnating electrical condensers with castor oil used with successful results, the vacuum at the end of the preliminary drying cycle is not less than 1½ mm of mercury as shown by a standard gauge and the temperature in all cases should not be less than 225° F. During the impregnating treatment in the second tank, the evacuation is continued to a vacuum of 2 mm mercury and the heating temperature used is not less than 200° F. and not more than 225° F. With the vacuum still on, this heat should be maintained until the maximum temperature is reached and held at this point for about ½ hour. During the impregnation proper by the castor oil or similar compound, the vacuum in the tank should be maintained at not less than 2 mm mercury. After all the oil has entered the impregnating tank the heat supply is shut off and the cooling cycle started. As soon as the temperature has decreased to about 100° F., the vacuum is released and the oil removed from the drying tank. The tank can then be opened and the condenser removed for further assembly such as for mounting in metal containers in accordance with well known practice in the art.

The castor oil or similar liquid previously to entering the treating tank and condenser units may be dried in a vacuum dryer or it may be slightly warmed without affecting its characteristics, but in any case, only the condensers in the treating tank are originally heated to a point above the temperature which when applied to the castor oil or similar liquid would impair its insulating characteristics. The impregnating castor oil is subjected to the required heating only during a comparatively short period of the impregnation process; that is, the heating is temporary only in such a manner that the average temperature applied is insufficient to materially injure its electrical characteristics but is momentarily sufficiently high to decrease its viscosity to an extent to insure efficient and thorough impregnation of the condensers or similar electrical devices.

As is evident from the above the novel method of impregnation as described by the invention, permits of manufacturing electrical condensers impregnated with vegetable oils primarily castor oils and applying the requisite heat to the condenser units for evacuation and efficient removal of air and moisture from the fibrous condenser dielectric and thorough impregnation without materially affecting the insulating and other electrical characteristics of the impregnating medium.

While I have described my invention in its preferred form, I desire it to be understood that modifications may be made and that no limitations of the invention are intended other than imposed by the scope of the appended claims.

I claim:

1. A method of impregnating electrical condenser units comprising metallic elements interleaved with absorbent separators with castor oil, which comprises the steps of heating and evacuating the condenser units to expel air and moisture from within the interstices thereof and to raise the temperature of the units to a predetermined value, interrupting both the heating and evacuation and immediately thereafter admitting substantially unheated castor oil, said castor oil adapted to become heated by contact with the hot condenser units to a degree sufficient to increase its fluidity to afford penetration into the interstices of the units but insufficient to affect its insulating characteristics, and thereafter releasing the vacuum and allowing the condenser units to cool.

2. A method of impregnating electrical condenser units comprising metallic elements interleaved with absorbent separators with castor oil, comprising the steps of subjecting the condenser units to a preliminary heating and evacuation process at a predetermined temperature and in a vacuum of predetermined pressure, thereupon subjecting the condenser units to a second heating and evacuation process at a different predetermined temperature and in a vacuum of different predetermined pressure to expel air and moisture from within the interstices of the units and to raise the temperature of the units to a predetermined value, interrupting both the heating and evacuation, and immediately thereafter admitting castor oil, said castor oil adapted to become heated by contact with the hot condenser units to a degree sufficient to increase its fluidity to afford penetration into the interstices of the units but insufficient to affect its insulating characteristics, and thereafter releasing the vacuum and allowing the condenser units to cool.

3. A method of impregnating electrical condenser units comprising elements of conductive and absorbent material with castor oil, comprising the steps of heating and exhausting the condenser units in a vacuum of about 2 mm pressure mercury and at a temperature of between 200 and 220° F. to expel air and moisture from within the interstices of the units, interrupting both the heating and evacuation and immediately thereafter admitting castor oil, said castor oil adapted to become heated by contact with the hot condenser units to a degree sufficient to increase its fluidity to afford penetration into the interstices of the units, but insufficient to affect its insulating characteristics.

4. A method of impregnating electrical condenser units comprising metallic elements interleaved with absorbent separators with castor oil which comprises the steps of subjecting the condenser units to a heating and evacuation process at a temperature of about 225° F. and in a vacuum of about 1.5 mm pressure mercury, thereafter subjecting the units to a second heating and evacuation process in a vacuum of about 2 mm and at a temperature of between 200 and 225° F., interrupting both the heating and evacuation and admitting castor oil, said castor oil adapted to become heated by contact with the hot condenser units to a degree sufficient to increase is fluidity to afford penetration into the interstices of the units but insufficient to affect its insulating characteristics, and releasing the vacuum and allowing the condenser units to cool.

5. The method of impregnating a porous substance with an insulating oil whose dielectric characteristic is impaired by heat which comprises the steps of applying a vacuum to the porous substance for expelling contained air and moisture, applying heat to the porous substance to raise the temperature thereof to a degree sufficient for expelling the contained air and moisture and for storing sufficient heat therein to momentarily thin out the oil when it is subsequently brought into contact therewith but insufficient to affect the dielectric characteristic of the oil, introducing the oil to the porous substance at a lower temperature than that of the heated porous substance to momentarily thin out the oil and thoroughly impregnate the porous substance with the oil, and thereafter releasing the vacuum and allowing the oil impregnated porous substance to cool.

6. The method of impregnating an electrical unit containing a porous substance with castor oil whose dielectric characteristic is impaired by heat which comprises the steps of applying a vacuum to the porous substance for expelling contained air and moisture, applying heat to the porous substance to raise the temperature thereof to a degree sufficient for expelling the contained air and moisture and for storing sufficient heat therein to momentarily thin out the oil when it is subsequently brought into contact therewith but insufficient to affect the dielectric characteristic of the oil, introducing the oil to the porous substance at a lower temperature than that of the heated porous substance to momentarily thin out the oil and thoroughly impregnate the porous substance with the oil, and thereafter releasing the vacuum and allowing the oil impregnated porous substance to cool.

7. The method of impregnating a porous substance with an insulating oil whose dielectric characteristic is impaired by heat, which comprises the steps of applying a vacuum to the porous substance for expelling contained air and moisture, applying a relatively high heat to the porous substance to raise the temperature thereof to a degree sufficient for expelling the contained air and moisture, further heating the porous substance at a reduced temperature to reduce the heat stored therein so that the porous substance acts to momentarily thin out the oil when it is subsequently brought into contact therewith without impairing the dielectric characteristic of the oil, introducing the oil at a lower temperature than that of the heated porous substance to the heated porous substance to momentarily thin out the oil and thoroughly impregnate the porous substance with the oil and thereafter releasing the vacuum and allowing the oil impregnated porous substance to cool.

8. The method of impregnating an electrical unit containing a porous substance with castor oil whose dielectric characteristic is impaired by heat, which comprises the steps of applying a vacuum to the porous substance for expelling contained air and moisture, applying a relatively high heat to the porous substance to raise the temperature thereof to a degree sufficient for expelling the contained air and moisture, further heating the porous substance at a reduced temperature to reduce the heat stored therein so that the porous substance acts to momentarily thin out the oil when it is subsequently brought into contact therewith without impairing the dielectric characteristic of the oil, introducing the oil at a lower temperature than that of the heated porous substance to the heated porous substance to momentarily thin out the oil and thoroughly impregnate the porous substance with the oil and thereafter releasing the vacuum and allowing the oil impregnated porous substance to cool.

WILLIAM FRENCH ARNOLD.